B. G. LAMME.
EQUALIZING MEANS FOR DYNAMO ELECTRIC MACHINES.
APPLICATION FILED JULY 24, 1912.

1,186,804.

Patented June 13, 1916.

WITNESSES:
Fred H. Miller
Otto S. Schairer

INVENTOR
Benjamin G. Lamme
BY
Staley G. Carr
ATTORNEY

UNITED STATES PATENT OFFICE.

BENJAMIN G. LAMME, OF PITTSBURGH, PENNSYLVANIA, ASSIGNOR TO WESTINGHOUSE ELECTRIC AND MANUFACTURING COMPANY, A CORPORATION OF PENNSYLVANIA.

EQUALIZING MEANS FOR DYNAMO-ELECTRIC MACHINES.

1,186,804.

Specification of Letters Patent.

Patented June 13, 1916.

Application filed July 24, 1912. Serial No. 711,198.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Equalizing Means for Dynamo-Electric Machines, of which the following is a specification.

My invention relates to alternating current motors, generators and other dynamo-electric machines, and it has for its object to provide means for equalizing, or producing substantial uniformity in the distribution, of the voltages, magnetic fluxes and magnetic pulls in the windings and magnetic circuits of such machines.

Figure 1:
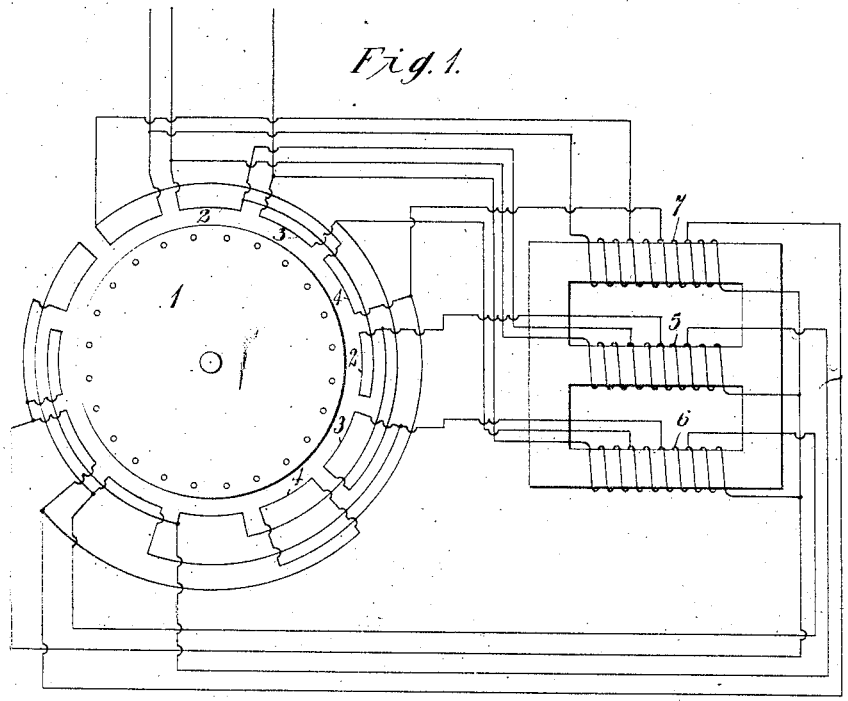
Figure 2:
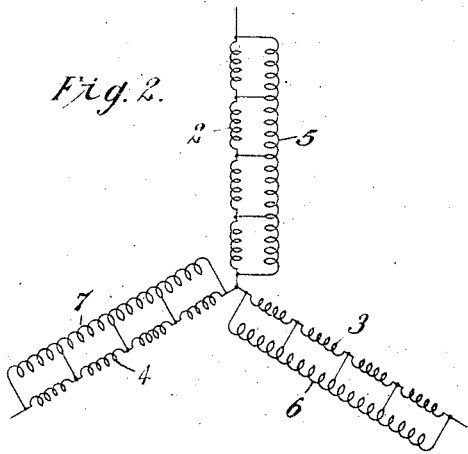
Figure 3:
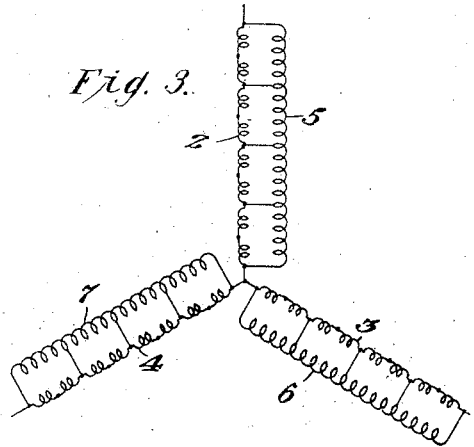

My invention is illustrated in the accompanying drawing, Figure 1 of which is a diagrammatic view of an induction motor connected and arranged in accordance therewith, and Figs. 2 and 3 are simplified diagrammatic views illustrating the invention.

As here shown, the invention is employed in connection with an ordinary three-phase induction motor 1 having a star-connected primary winding comprising three sets of coils 2, 3 and 4 corresponding respectively to the several phases of current and each set comprising as many coils or groups of coils as there are poles per phase, which, in the present instance, is four. In Fig. 1, curved lines are employed to indicate the polar coils or groups of coils, it being understood that each polar winding may comprise either a single coil or several coils that are connected in series or other suitable relation. Corresponding to the several phases of the current are three inductive windings 5, 6 and 7 that are divided into a plurality of substantially equal lengths, and the points of sub-division of which are respectively connected to the terminals of the coils or groups of coils of the corresponding phase portion of the primary winding of the motor. This is clearly illustrated in Fig. 2. The windings 5, 6 and 7 may be mounted upon separate cores or upon different legs of the same magnetic core, as shown.

Since the inductive windings are divided into a plurality of portions having substantially equal numbers of convolutions, equal voltages are developed in the several portions thereof, and since these equal portions are connected in parallel to corresponding coils or groups of coils in the primary winding of the motor, the said inductive windings will have the effect of rectifying any tendency toward inequality of the voltages in the coils of the motor winding because the several portions of the inductive windings will either receive or yield cross currents which effect the desired equalization. Equality of voltage necessarily means equality of magnetic fluxes, and balanced magnetic pulls upon all sides of the rotating member of the machine. As the inductive windings need have sufficient capacity only for the cross currents necessary to produce equalization, which, in the case of an induction motor, is usually very small, and probably not more than one-fifth of the magnetizing current of the motor, which, in turn, is only about one-third the rated full load current of the motor, it is obvious that the inductive device required for equalization is comparatively small in most instances.

The equalizing inductive windings may be located either in the machine in connection with which they are employed or externally thereto, as desired. In some instances, it may be desirable, in order to reduce the number of connections between the inductive windings and the windings of the machine, to connect only alternate coils or groups of coils to the equally spaced points of sub-division of the inductive windings, for instance, as shown in Fig. 3.

It will, of course, be understood that the invention may be employed in connection with other dynamo-electric machines than induction motors, and with machines having any number of current phases, the drawing showing only one of its many applications.

I claim as my invention:

1. The combination with a dynamo-electric machine having a polyphase winding each phase portion of which comprises a plurality of coils, of inductive windings corresponding respectively to the several differently phased portions of the winding and having points of sub-division respectively connected to terminals of the coils.

2. The combination with a dynamo-electric machine having a polyphase winding each phase portion of which comprises a plurality of coils, of inductive windings corresponding respectively to the several differently phased portions of the winding and having substantially equally spaced points of sub-division respectively connected to terminals of the corresponding coils.

In testimony whereof, I have hereunto subscribed my name this 3rd day of July, 1912.

BENJ. G. LAMME.

Witnesses:
GEO. B. THOMAS,
B. B. HINES.